United States Patent [19]

Rekers et al.

[11] Patent Number: 4,624,980

[45] Date of Patent: Nov. 25, 1986

[54] N-T-ALKYL-N-SEC-ALKYL SECONDARY AMINE COMPOUNDS

[75] Inventors: John W. Rekers, Spartanburg; Edward W. Kluger, Pauline, both of S.C.

[73] Assignee: Milliken Research Corporation, Spartanburg, S.C.

[21] Appl. No.: 717,049

[22] Filed: Mar. 28, 1985

Related U.S. Application Data

[63] Continuation of Ser. No. 646,303, Aug. 31, 1984, abandoned.

[51] Int. Cl.$^4$ .................. C08K 5/17; C08K 5/37; C08L 23/00
[52] U.S. Cl. .................. 524/238; 524/239; 524/243; 524/244; 524/245; 524/247; 524/249; 525/293; 525/332.7; 525/380; 528/64; 528/75; 528/79; 528/84; 528/85; 528/290; 528/291; 560/152; 560/147; 560/193; 560/220; 564/457; 564/461; 564/462; 564/503; 564/505; 564/506
[58] Field of Search .............. 524/247, 249, 238, 239, 524/240, 244, 245, 928, 929, DIG. 913; 525/293, 332.7, 380; 528/64, 79, 75, 84, 85, 290, 291; 260/DIG. 19

[56] References Cited

U.S. PATENT DOCUMENTS

| | | | |
|---|---|---|---|
| 3,028,367 | 4/1962 | O'Brien | 528/85 |
| 3,288,748 | 11/1966 | Cyba | 524/249 |
| 3,365,435 | 1/1968 | Adams et al. | 524/249 |
| 3,418,395 | 12/1968 | Taniguchi et al. | 525/380 |
| 3,478,096 | 11/1969 | Cyba | 528/85 |
| 3,527,804 | 9/1970 | Cyba | 524/929 |
| 4,104,254 | 8/1978 | Lai et al. | 524/95 |
| 4,213,892 | 7/1980 | Scott | 525/384 |
| 4,326,061 | 4/1982 | Son et al. | 546/164 |
| 4,356,287 | 10/1982 | Loffelman et al. | 525/204 |

FOREIGN PATENT DOCUMENTS 1398701 5/1965 France.
1565775 5/1969 France.

OTHER PUBLICATIONS

Patrick, D. W. et al., J. Org. Chem., vol. 43, No. 13, pp. 2628–2638 (1978).

Primary Examiner—Veronica P. Hoke
Attorney, Agent, or Firm—H. William Petry; Terry T. Moyer

[57] ABSTRACT

An N-t-alkyl-N-sec-alkyl secondary amine compound of the formula:

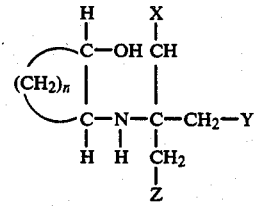

wherein X, Y and Z are each independently selected from —H, —OH, or an alkyl group having from 1 to about 15 carbon atoms; and n is an integer of from 3 to about 6.

9 Claims, No Drawings

N-T-ALKYL-N-SEC-ALKYL SECONDARY AMINE COMPOUNDS

This is a continuation of application Ser. No. 646,303, filed Aug. 31, 1984 now abandoned.

This invention relates to certain N-t-alkyl-N-sec-alkyl secondary amine compounds and to a method for preparing such compounds. This invention also relates to a method for extending the useful life of polymers by enhancement of their resistance to degradation by ultraviolet light.

Polymers have in the past and continue to provide an attractive substitute for the more traditional types of structural materials (e.g., wood and metals) because of relatively inexpensive material and fabrication costs. As polymers continue to find new applications in, for example, the fabrication of automotive parts and building materials, they must also become more durable and capable of withstanding prolonged exposure to a variety of degradative forces. Degradation of polymers can be caused by exposure to light, heat, moisture and/or air. Such degradation is usually manifest by either a partial or total loss of structural integrity, changes in light transmission properties, changes in color, loss or reduction in flexibility and/or resiliency, or any combintation of the above phenomenon. Those attempting to avoid polymer degradation have generally selected from among three possible approaches: (a) elimination or reduction of the degradative forces; (b) isolation of the sensitive polymer material from the degradative forces; or (c) modification of the polymer composition to enhance its resistance to degradative forces. The latter approach is generally preferable since it does not require elaborate engineering or structural changes in the polymer product environment.

There are a variety of additives which have been disclosed as suitable for enhancing the resistance of polymers to one or more of the degradative forces discussed hereinabove. These additives (hereinafter referred to as "stabilizers") can be physically combined with or engrafted upon the environmentally sensitive polymer, thereby prolonging its useful life in the hostile degradative environment. Stabilizers are available which can enhance the polymers' resistance to more than one of the degradative forces. Conversely, a stabilizer which is effective for prevention of, for example, oxidative degradation may have little if any effect upon the polymers' resistance to other degradative agents. Thus, it is not uncommon for polymers to contain a variety of stabilizer materials, each being present for the prevention of a particular degradative reaction.

One of the more difficult to control of the degradative forces is irradiation of the polymer by ultraviolet light. The impact of such irradiation will of course vary depending upon the intensity and duration of exposure and thus may manifest itself only after a prolonged interval. The irradiation of polymers with ultraviolet light can often times cause cross-linking of these materials thereby reducing resiliency and/or impact resistance. Changes in color and opacity are also often effected by prolonged exposure of the polymer to ultraviolet light. While many materials are known, and commercially available, as stabilizers against ultraviolet light degradation, the degree of protection afforded by such agents is often concentration dependent. The following list of references are illustrative of the various types of ultraviolet absorbers commonly used in conjunction with polymeric materials sensitive to UV photodegradation: U.S. Pat. Nos. 3,362,929; 3,362,930; 3,829,292; 3,901,849; 3,910,918; 3,939,164; U.K. Pat. No. 999,806; and an article appearing in J. Am. Chem. Soc., Vol. 60: 1458 et seq. (1938).

The stabilization of polymeric materials with nitrogen-containing compounds such as piperidines and piperazinones has been previously reported in the open literature. Unfortunately, however, fully hindered piperidines and piperazinones suffer from a number of disadvantages, including difficulty of manufacture, e.g., a multi-step synthesis is typically required. A variety of quinoline compounds are also reported as having ability as UV stabilizers and while they may be somewhat simpler to manufacture than the piperidines and piperazinones, they are typically less effective as UV stabilizers.

The present invention provides certain new compounds which are highly effective as UV stabilizers and which are furthermore easily and economically manufactured in high yields.

Accordingly, an N-t-alkyl-N-sec-alkyl secondary amine is provided of the formula:

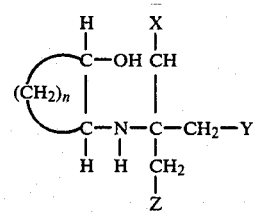

wherein X, Y and Z are each independently selected from —H, —OH, or an alkyl group having from 1 to about 15 carbon atoms; and n is an integer of from 3 to about 6.

The novel compounds of the present invention may be broadly described as reaction products of a suitable t-alkyl primary amine with a cycloaliphatic epoxide in the presence of a Lewis acid catalyst according to the following general equation:

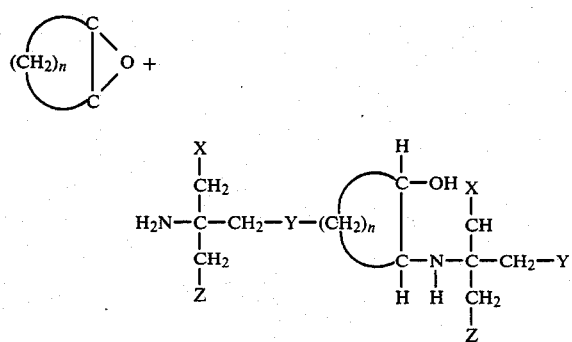

wherein X, Y, Z, and n have the values given above. While the reaction product may be used directly as a UV stabilizer, according to an embodiment of the invention, the reaction product may be further reacted typically through the hydroxy functionality to provide products having certain beneficial properties in the specific polymer requiring UV stabilization. Examples of such further reaction include esterification, ethoxylation, propoxylation, alkylation and oligomerization.

The present invention also relates to a process for preparing N-t-alkyl-N-sec-alkyl secondary amine compounds which comprises reacting a cycloaliphatic epoxide having from 1 to about 4 cycloaliphatic groups; and wherein each cycloaliphatic group contains from about 5 to about 8 carbon atoms and wherein furthermore said cycloaliphatic epoxide contains from about 1 to about 4 epoxy groups with at least 1 t-alkyl primary amine compound wherein said compound contains from 1 to about 2 amino groups and from about 4 to about 22 carbon atoms, said reaction occurring in the presence of a Lewis acid catalyst provided in an amount sufficient to catalyze said reaction.

The ratio of secondary amine compound to cycloaliphatic epoxide compound may vary over a wide range. Preferably, however, approximately an equal molar ratio of epoxide to amine may be employed. Even more preferably, it has been found that an excess of an amine compound may be preferred and, in fact, such excess amine compound may function as a solvent for the reaction.

The amount of Lewis acid catalyst employed may also vary over a wide range typically from about 1 to about 25% by weight based upon the weight of the epoxide present in the reaction mixture. A wide range of Lewis acid catalysts may be used. Preferred catalysts include calcium chloride, aluminum chloride, ferric chloride, borontrifluoride, ferrous chloride, zinc chloride and tin chloride. The most preferred catalyst has been found to be zinc chloride which has been found to provide an easily controlled reaction, high yields and few side reactions.

A wide range of solvents may also be employed in the reaction or, alternatively, the reaction may be carried out in the absence of a solvent. Some solvent may, however, be desirable to maintain the fluidity and good agitation of the reactants. Preferred catalysts include benzene, toluene, and xylene, although toluene is the most preferred solvent.

A wide range of temperatures may be employed to carry out the reaction. Typically, temperatures in the range of from about 60° C. to about 140° C. have been found to be desirable. The most preferred temperature range is from about 90° C. to about 120° C.

A wide range of cycloaliphatic epoxide compounds and t-alkyl primary amine compounds may be employed as starting materials in the process of the present invention. Typical cycloaliphatic epoxide compounds which may be employed include cyclohexene oxide, cyclopentene oxide, cyclooctene oxide, cyclooctadiene dioxide, isophorone oxide, vinyl cyclohexene oxide, cyclopentadiene dioxide, and pinene oxide. Other cycloaliphatic epoxides which may be employed include those having the following structural formula which are available from Union Carbide and identified by the designations provided under the depiction of the structural formula set forth below:

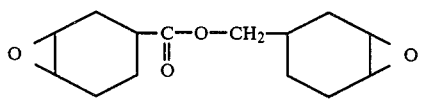

UCC ERL 4221

-continued

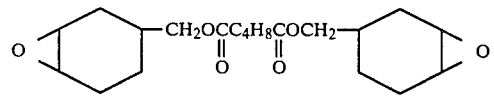

UCC ERL 4299

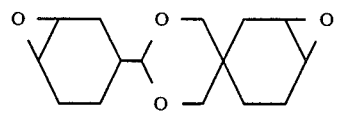

UCC ERL 4234

The preferred cycloaliphatic epoxide compounds for use in the process of the present invention include cyclohexene oxide as well as Union Carbide's ERL 4221 and ERL 4299, the structural formulas of which are set forth above.

A wide range of t-alkyl primary amine compounds may also be employed, including t-butyl amine; t-octyl amine; 2-amino-2-methylpropanol; 2-amino-2-methyl-1,3-propanediol; 2-amino-2-hydroxymethyl-1,3-propanediol; 2-amino-2-ethyl-1,3-propanediol; t-dodecylamine; t-octadecylamine; 2,5-diamino-2,5-dimethylhexane; and 1,8-diamino-p-menthane.

The most preferred t-alkyl primary amine compounds which may be employed in the process of the present invention include t-butyl amine; t-octyl amine; 2-amino-2-methylpropanol; 2-amino-2-methyl-1,3-propanediol; 2-amino-2-hydroxymethyl-1,3-propanediol and 2-amino-2-ethyl-1,3-propanediol.

The amine/epoxide reaction products of this invention are very efficient and effective stabilizers for materials that are degraded by actinic radiation. However, it is often useful to further elaborate the amine/epoxide reaction product in order to obtain specific beneficial properties such as decreased volatility and extractability, improved compatibility, reactivity, and convenient physical properties. The products of the invention are ideally suited for further chemical transformations because they always contain at least one hydroxyl functionality, and usually more, depending on the specific amine and epoxide used.

For example, the compatibility and migration tendencies of an amine/epoxide reaction product in hydrocarbon resins is readily modified by esterification, using standard techniques, with aliphatic carboxylic acids or acid halides. Examples of specific carboxylic acids include acetic acid, propionic acid, isobutyric acid, octanoic acid, dodecanoic acid, and octadecanoic acid. Generally, any straight or branched chain alkanoic acid or acid halide containing about 2 to 18 carbon atoms is suitable. Similarly, esterification of an amine/epoxide reaction product with alkanedioic acid derivatives provides higher molecular weight bis functionalized stabilizers.

Alternatively, esterification of the amine/epoxide reaction products can be used to provide reactivity. The stabilizer can then be chemically bound to a polymer via grafting or copolymerization using procedures such as those described by Scott in U.S. Pat. No. 4,213,892 or Meyer, et al. in *Rubber Chem. Tech.* 46 106 (1973). This property is particularly useful if the stabilizers of the invention are used in polymers which are subjected to aggressive or leaching environments during service, such as in certain automotive applications, or in which the fabricated polymer article has a high surface to volume ratio, such as in fibers or coatings. Specific examples of transformations which provide reactivity to the amine/epoxide reaction product include esterification with acrylate, methacrylate, thioglycolate, or 2-mercaptopropionate derivatives.

Additionally, some of the reactive stabilizers described above can undergo polymerization to higher molecular weight oligomeric and polymeric products. Generally, oligomeric stabilizers in the 1000 to 5000 molecular weight range have been found useful for providing non-migrating additives with lower extractability. Alternatively, oligomeric stabilizers can be obtained by condensation polymerization of amine/epoxide reaction products containing at least two hydroxyl groups with difunctional acid derivatives. Examples of difunctional acid derivatives which are useful for this purpose include isophthalic acid, dimethyl terephthalate, succinic acid, glutaric acid, adipic acid, suberic acid, and sebacic acid. Generally, any difunctional acid containing about 3 to about 20 carbon atoms is suitable. These oligomeric polyester derivatives can be prepared using standard condensation polymerization methods.

Another beneficial modification of the amine/epoxide reaction products is ethoxylation and/or propoxylation to give stabilizers containing pendant polyalkylene oxide chains. Particularly useful in this regard are amine/epoxide reaction products containing at least two polyalkylene oxide chains because the resulting stabilizers are co-reactive with certain coating resins, such as epoxy and urethane systems. The length of the polyalkylene oxide chains can be controlled by standard methodology to provide the desired degree of hydro or oleophilicity for a specific application.

The above discussion of useful transformation of amine/epoxide reaction products is not meant to be all inclusive, but merely indicative of beneficial modifications well-known to those skilled in the art.

Materials that can be stabilized using the amine/epoxide reaction products and modification products thereof include any material that demonstrates degradation on exposure to actinic radiation, such as by discoloration or embrittlement. Examples of materials that can be stabilized are natural rubber, synthetic rubbers, polyurethanes, PVC resins, ABS resins, polystyrene, polyacrylonitrile, polymethacrylates, polycarbonates, varnish, polyepoxides, polyesters, and polyolefins, such as polyethylene, polypropylene, ethylene-propylene polymers, ethylene-propylene-diene polymers, and ethylene vinyl acetate, as well as mixtures and blends of the above polymeric materials.

The compounds of this invention are particularly useful as UV stabilizers for polyolefins, especially polyethylene, polypropylene, polybutylene, and the like, and copolymers thereof.

The amine/epoxide reaction products and modification products of this invention are generally used at a level of about 0.05% to about 5% based on the weight of the polymeric substrate. Preferably, the composition contains from about 0.1% to about 2% based on the weight of the polymeric substrate.

Optionally, the composition may contain other additives, such as antioxidants, supplemental light stabilizers, plasticizers, flame retardants, antistatic and antislipping agents, fillers, dyes, pigments, and the like. Particularly advantageous stabilization effects can be obtained through the use of supplemental antioxidants and light stabilizers.

The stabilizers of this invention may be incorporated into the polymeric substrate by any of the known techniques for compounding additives with a polymer, such as solvent blending, dry blending, milling, Banburg mixing, molding, casting, extruding, swelling, masterbatching, and the like.

The following examples serve to illustrate the subject matter of the present invention and are not to be construed as limiting the scope of the invention. All parts and percentages which are set forth are by weight unless otherwise indicated.

EXAMPLE 1

Preparation of N-t-octyl-N-2-hydroxycyclohexylamine

In a 1000 cc three neck flask was charged 86.6 gms (0.88 moles) of cyclohexene oxide, 114.0 gms (0.88 moles) of t-octyl amine, 5 grams of zinc chloride, and 2.2 gms of polycat-8 (Abbot Laboratories). The mixture was then heated at 95°–100° C. for about 10 hours. The crude mixture was stripped of low boilers and then was dissolved in methylene chloride and washed with ammonium hydroxide solution. The methylene chloride solution was dried over magnesium sulfate, filtered and stripped to give a liquid. The product was distilled at 121° C. (0.3 mmHg) to give a colorless liquid. A GLC analysis of the distilled product showed it to be 98.6% purity.

EXAMPLE 2

Following the procedures set forth in Example 1, N-2-hydroxycyclohexyl-N-(2-hydroxymethyl-2-propyl)amine was produced. The following ingredients were utilized:
- 122.5 grams of cyclohexene oxide
- 89.1 grams of 2-amino-2-methyl-1-propanol
- 11 grams of zinc chloride
- 6 grams of polycat-8 catalyst

EXAMPLE 3

Following the procedures set forth in Example 1, N-2-hydroxycyclohexyl-N-(1,1-dihydroxymethyl-1-ethyl)amine was produced. The following ingredients were utilized:
- 122.5 grams of cyclohexene oxide
- 105.1 grams of 2-amino-2-methyl-1,3-propanediol
- 11 grams of zinc chloride
- 6 grams of polycat-8 catalyst

EXAMPLE 4

Following the procedure of Example 1, N-2-hydroxycyclohexyl-N-(1,1-dihydroxymethyl-1-propyl)amine was produced. The following ingredients were employed:
- 122.5 grams of cyclohexene oxide
- 119.0 grams of 2-amino-2-ethyl-1,3-propanediol
- 11 grams of zinc chloride
- 6 grams of polycat-8 catalyst

EXAMPLE 5

Following the procedure of Example 1, Bis-N,N'-2-hydroxycyclohexyl-2,5-diamino-2,5-dimethylhexane was produced. The following ingredients were employed:
- 245.0 grams of cyclohexene oxide
- 144.0 grams of 2,5-dimethyl-2,5-hexanediamine 22 grams of zinc chloride
12 grams of polycat-8 catalyst

EXAMPLE 6

Preparation of N-t-butyl-N-2-hydroxycyclohexylamine: A mixture of cyclohexene oxide (19.6 g), t-butyl amine (37.1 g), zinc chloride (2.5 g), and 50 ml of toluene were sealed under an inert atmosphere in a Diels-Alder flask. The contents were stirred and heated in a sand bath at 120° C. for 23 hours. After cooling the slurry was diluted with 100 ml of toluene, washed with dilute ammonium hydroxide solution (3×250 ml) and water (300 ml), dried ($Na_2SO_4$), filtered, and the solvents were removed under reduced pressure to give 31.6 g of N-2-hydroxycyclohexyl-N-t-butylamine as an off-white, waxy solid, m.p. 42°–44° C.

EXAMPLE 7

A mixture of 25.2 g of UCC ERL 4221, 26 ml of t-butylamine, 2 g of zinc chloride, 0.2 g of hydroquinone monomethyl ether, and 50 ml of toluene were reacted as in Example 6 at 115°–120° C. for 40 hours. The product was isolated as in Example 6 to give 32.7 g of a viscous yellow oil. Gas chromatography showed that the product was a mixture of stereo and positional isomers. 'H NMR indicated that ca. 91% incorporation of t-butylamine had occurred.

EXAMPLE 8

A mixture 18.3 g of UCC ERL 4299, 59.6 g of Primene JM-T (a mixture of $t-C_{18}H_{57}NH_2$ to $t-C_{22}H_{45}NH_2$ available from Rohm and Hass Co.), 2.0 g of zinc chloride, 0.8 g of polycat, and 50 ml of toluene were reacted as in Example 6. After work-up there was obtained 32.0 g of the aminated adduct as a dark viscous oil. NMR and IR spectra were consistent with the expected mixture of positional and stereo isomers.

EXAMPLE 9

To a cooled, stirred mixture of 9.8 g of the product from Example 5, 10 ml of triethylamine, and 200 ml of abs. ether was added 7.6 g of chlorotrimethylsilane over 10 minutes. After stirring at ambient temperature for 24 hours, the reaction was filtered. The ether was removed under reduced pressure to give a colorless oil. The oil was treated with 90 ml of hexanes, filtered, stripped, and dried under high vacuum to give 10.5 g of the colorless disilane. The structure was confirmed by 'H and $^{13}C$ NMR spectra.

EXAMPLE 10

A mixture of 6.5 g of the product from Example 5, 9.5 g of isobutyric acid, and 170 ml of toluene were heated to reflux with water separation via Dean-Stark trap. After 20 hours the reaction was cooled, washed with 5% $NaHCO_3$ (2×200 ml) and brine (200 ml), dried ($Na_2CO_3$), filtered, and solvents removed under reduced pressure to give the nearly colorless diester, homogeneous by TLC and GC. The structure was confirmed by 'H NMR and IR spectra.

EXAMPLE 11

The bis-thioglycolate ester of the product from Example 5 was prepared in a manner similar to Example 10. The crude oily diester had IR and NMR spectra consistent with the structure, and was evaluated without purification.

EXAMPLE 12

To a 100 ml flask were charged 13.06 g of the product from Example 5, 9.61 g of dimethyl glutarate, and 0.2 g of sodium methoxide. Under a slow argon purge the mixture was heated in a sand bath at 190° C. for 20 hours. The reaction was then connected to a vacuum pump and the pressure was slowly lowered to ca. 0.1 mm. After 1 hour the reaction was cooled to give an amber, gummy oligomer. This material was dissolved in methylene chloride, filtered, stripped, and dried under high vacuum. End group determination of the resulting product by 'H NMR indicated that the polyester had an average molecular weight of ca. 1800.

EXAMPLE 13

A mixture of 6.0 g of the amino alcohol obtained from Example 5 and 5.0 g of octanoic acid in 150 ml of toluene was heated under reflux with water separation for ca. 20 hours. The amber bis-octanoate ester (6.4 g) was obtained after work-up as in Example 10. The oily product had IR and NMR spectra consistent with the structure.

EXAMPLE 14

A solution of 8.6 g of N-t-butyl-N-2-hydroxycyclohexylamine and 5.2 g of sebacic acid in 125 ml of toluene were heated to reflux under an inert atmosphere with water separation. After 40 hours the colorless reaction mixture was cooled, washed with 5% $NaHCO_3$ (2×125 ml) and brine (2×200 ml), dried ($Na_2SO_4$), filtered, stripped, and dried under vacuum to give a very pale yellow oil (8.5 g). The IR and NMR spectra were consistent with bis-(2-t-butylaminocyclohexyl)-sebacate.

EXAMPLE 15

A bis-adipate was prepared from N-t-butyl-N-2-hydroxycyclohexylamine and adipic acid using the procedure of Example 14. The product was a yellow oil which was evaluated without purification.

EXAMPLE 16

A solution of 9.4 g of the product from Example 5, 7.3 g of adipic acid, 0.1 g of titanium isopropoxide, and 100 ml of toluene was heated to reflux with water separation. After 24 hours the theoretical amount of water had collected. The solution was cooled and poured slowly into 400 ml of stirred hexanes. The material which separated was dissolved in 100 ml of methylene chloride, washed with 5% $NaHCO_3$ (2×100 ml) and water (100 ml), dried ($MgSO_4$), filtered and concentrated to ca. 50 ml under reduced pressure. Precipitation into 400 ml of hexane gave a highly viscous, nearly colorless oil (6.3 g), IR and NMR spectra were consistent with an oligomeric polyester.

EXAMPLE 17

The bis pivalate ester derivative of the product from Example 7 was prepared using the procedure of Example 10. After work-up, a dark amber oil was obtained (8.2 g). This material was filtered through a celite bed and then solidified on standing. Recrystallization from hexanes at −15° C. gave the diester, m.p. 74–83.

EXAMPLE 18

Some of the products prepared in Examples 1–17 were evaluated as UV stabilizers for polypropylene.

The additives were solvent blended (CH$_2$Cl$_2$) into unstabilized polypropylene powder (Hercules Profax 6501), air dried, and compression molded (3 minutes at 400° F. under 11 tons pressure) into films (0.006-0.008 inch thick). The films were then exposed to actinic radiation in a QUV accelerated weathering device (UV-A lamps) at ca. 45° C. The samples were checked daily for embrittlement using a 180° manual bend test. A commercially available stabilizer, Chimassorb 944 (Ciba-Geigy Corp.), was also tested in a similar manner. The results are shown in Table 1.

TABLE 1

| ADDITIVE | EMBRITTLEMENT TIME (DAYS) | |
|---|---|---|
| | 0.1% | 0.3% |
| Chimassorb 944 | 5½ | 16½ |
| Product of Example 1 | 6½ | 15½ |
| Product of Example 7 | 4½ | 7 |
| Product of Example 5 | 7½ | 11¼ |
| Product of Example 9 | 7½ | 20½ |
| Product of Example 10 | 9 | 31 |
| Product of Example 11 | 3 | — |
| Product of Example 12 | 4 | 15½ |
| Product of Example 13 | 4 | — |
| Product of Example 14 | 6½ | 31 |
| Product of Example 15 | 7 | 26½ |
| Product of Example 16 | 2 | — |
| Product of Example 17 | 9 | 31 |
| No Additive | 1 | |

EXAMPLE 19

Samples of polypropylene and high density polyethylene containing the products of Examples 14 and 15 were prepared in a manner similar to that described in Example 17. Base formulations were as follows:

| PP (PROFAX 6501) | HDPE (UCC 8007) |
|---|---|
| 0.10% calcium stearate | 0.05% Goodrite 3144 |
| 0.10% Goodrite 3114 | |

Films were exposed in an Atlas Xenon Weatherometer accelerated weathering device at 63° C and 30% pH. A commercially available stabilizer, Tinuvin 770 (Ciba-Geigy Corp.) was also tested. Embrittlement times are recorded in Table 3.

TABLE 3

| ADDITIVES | EMBRITTLEMENT TIME (H) | |
|---|---|---|
| | PP (0.2%) | HDPE (0.1%) |
| Base Formulation | 800 | 700 |
| Base & Product of Ex. 14 | 2300 | 2800 |
| Base & Product of Ex. 15 | 2800 | 3000 |
| Base & Tinuvin 770 | 2200 | 3500 |

EXAMPLE 20

An elastomeric polyurethane foam sample was prepared from 73 parts Elastofoam I-30100 resin, 27 parts Elastofoam I-30100 isocyanate (available from BASF), and 1 part of the product from Example 3. A control sample containing no added stabilizer was also prepared. After 8 hours exposure in an Atlas Xenon Weatherometer the stabilized sample showed substantially less discoloration than the control.

What is claimed is:

1. A polymer composition stabilized against photodegradation by ultraviolet light which comprises a polyolefin polymer selected from polyethylene, polypropylene, polybutylene, and copolymers thereof and from about 0.05% to about 5% based upon the weight of the polymer of at least 1 stabilizer compound, said compound comprising: the reaction product of a cycloaliphatic epoxide and a t-alkyl primary amine compound, said epoxide having from 1 to about 4 epoxy groups and from 1 to about 5 cycloaliphatic groups each of which contains from about 5 to about 8 carbon atoms and said t-alkyl primary amine compound containing from 1 to about 2 amino groups and from about 4 to about 22 carbon atoms, in a ratio of epoxide to amine of approximately an equal molar ratio to an excess of amine compound on a molar basis in the presence of from about 1 to about 25 percent by weight based upon the weight based upon the weight of the epoxide present of a Lewis acid catalyst at a temperature of from about 60° C. to about 140° C.

2. A method for extending the useful life of polymers which are sensitive of photodegradation by ultaviolet light, said method comprising: incorporating within said ultraviolet sensitive polymer from about 0.1 percent to about 2 percent based upon the weight of the polymer of at least one stabilizer compound, said compound comprising the reaction product of a cycloaliphatic epoxide and a t-alkyl primary amine compound, said epoxide having from 1 to about 4 epoxy groups and from 1 to about 5 cycloaliphatic groups each of which contains from about 5 to about 8 carbon atoms and said t-alkyl primary amine compound containing from 1 to about 2 amino groups and from about 4 to about 22 carbon atoms, in a ratio of epoxide to amine of approximately an equal molar ratio to an excess of amine compound on a molar basis in the presence of from about 1 to about 25 percent by weight based upon the weight based upon the weight of the epoxide present of a Lewis acid catalyst at a temperature of from about 60° C. to about 140° C.

3. The process of claim 2 wherein said amine epoxide reaction product is further modified by esterification of said reaction product wherein the esterification agent is selected from an alkanoic acid or acid halide containing from about 2 to about 18 carbon atoms.

4. The process of claim 2 wherein said amine epoxide reation product is esterified with an esterification agent selected from acrylate, methacrylate, thioglycolate, or 2-mercaptopropionate deriviatives and is then bound to a polymer via grafting or copolymerization.

5. The process of claim 2 wherein said amine epoxide reaction product is esterified with an esterification agent selected from acrylate, methacrylate, thioglycolate, or 2-merecaptopropionate derivatives and is then polymerized to a higher molecular weight polymeric product to provide non-migrating additives with lowered extractability.

6. The process of claim 2 wherein said amine epoxide reaction product is polymerized by condensation polymerization of said amine epoxide reaction product containing at least two hydroxyl groups with a dicarboxylic acid derivative containing from about 3 to about 20 carbon atoms to provide an oligomeric polyester derivative.

7. The process of claim 2 wherein said amine epoxide reaction product is reacted with a compound selected from ethylene oxide and propylene oxide to provide stabilizers containing pendant polyalkylene oxide chains.

8. A method for extending the useful life of polymers which are sensitive to photodegradation by ultraviolet light, said method comprising: incorporating with said ultravilet light sensitive polymer a UV stabilizer effective amount of at least one compound of the formula:

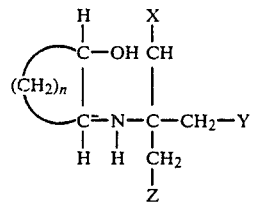

wherein X, Y and Z are each independently selected from —H; —OH; or an alkyl group having from 10 to about 15 carbon atoms, and n is an integer of from 3 to about 6.

9. The method of claim 8 wherein the ultraviolet sensitive polymer is an alpha mono-olefin.

* * * * *